United States Patent Office 3,101,583
Patented Aug. 27, 1963

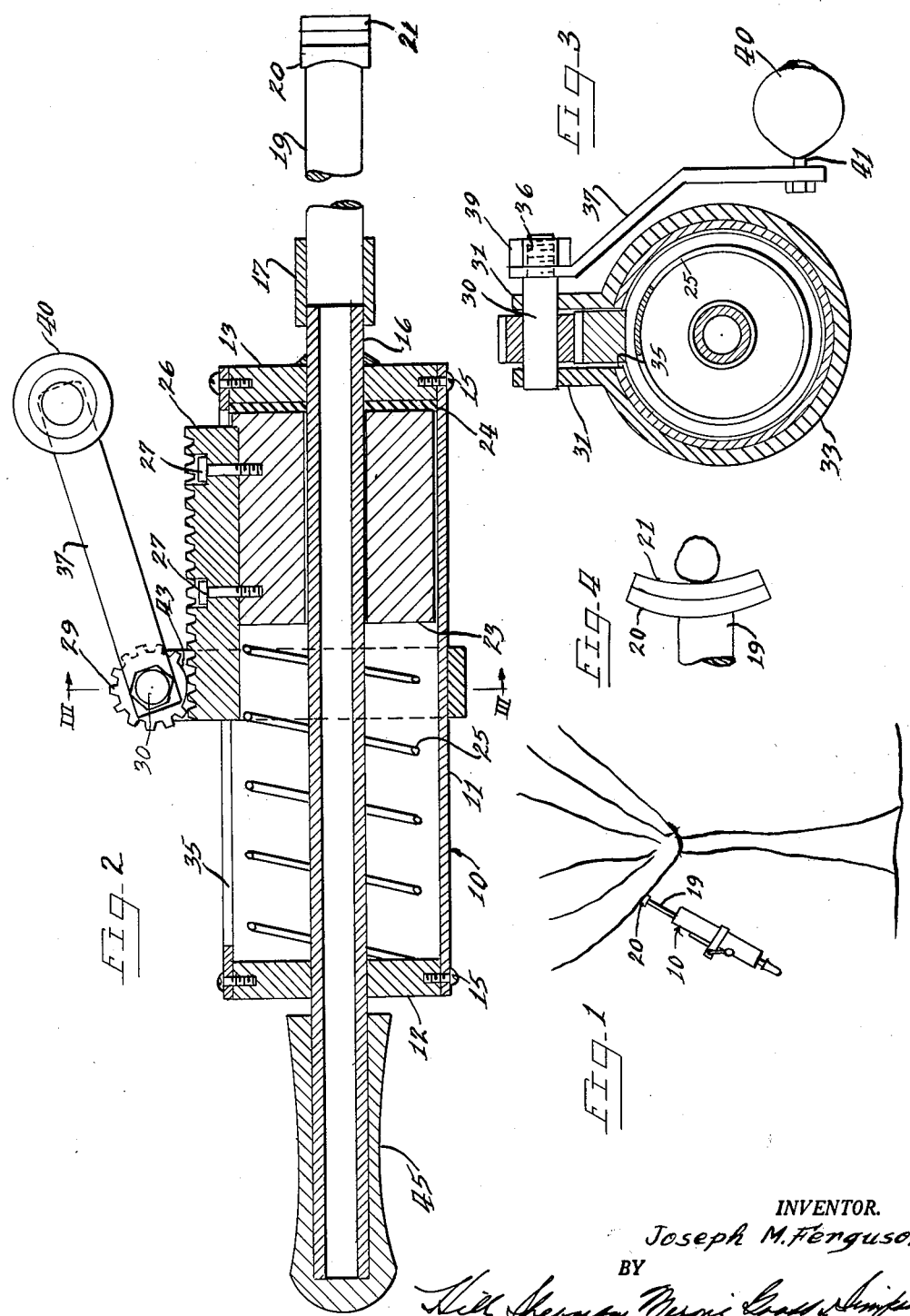

3,101,583
LIMB SHAKER
Joseph M. Ferguson, P.O. Box 36, Gonzales, La.
Filed Aug. 31, 1961, Ser. No. 135,187
1 Claim. (Cl. 56—328)

This invention relates to improvements in limb shakers and more particularly relates to shakers of the type particularly adapted to shake the limbs of fruit and nut trees to remove nuts therefrom.

A principal object of the invention is to provide a simple and improved form of limb shaker arranged with a view toward lightness and compactness in construction and efficiency in operation.

Another object of the invention is to provide a simple and compact form of shaker for the limbs of trees and the like in which the shaking action is attained by the release of the stored-up energy of a spring.

Still another object of the invention is to provide a simple and economical form of limb shaker for shaking fruit and nuts from trees in which a saddle having a resilient engaging portion is engaged with the limb of a tree and by shaking action is attained by the use of a weighted plunger, engaged with a stationary abutment connected to and in alignment with the saddle and by the stored-up energy of a spring.

These and other objects of the invention will appear from time to time as the following specification proceeds and with reference to the accompanying drawings wherein:

FIGURE 1 is a diagrammatic view showing a limb shaker constructed in accordance with the invention in engagement with the limb of a tree for shaking the limb;

FIGURE 2 is a longitudinal sectional view taken through a limb shaker constructed in accordance with the invention;

FIGURE 3 is a transverse sectional view taken along line III—III of FIGURE 2; and FIGURE 4 is a fragmentary detail view showing the saddle in engagement with the limb of a tree.

In the embodiment of the invention illustrated in FIGURES 1 and 2, I have shown a limb shaker 10 including a generally cylindrical casing 11 having a rear end wall 12 and a front end wall 13 secured to opposite ends thereof as by machine screws 15. Extending through the casing 11 and the rear and front end walls 12 and 13 respectively is a shaft 16, shown as being hollow for lightness in weight and welded or otherwise secured to the front end wall 13. The shaft 16 has a socket at its front end for receiving a rod 19 having a saddle 20 mounted on and extending across its front end. The saddle 20 may be faced with rubber or a like resilient material as indicated by reference character 21 and adapted to be placed in engagement with the limb of a tree to impart a shock or shaking action thereto. The resilient face 21 of the saddle 20 is provided to avoid damage to the bark of the tree. The rod 19 may be made from aluminum or any other lightweight material as may the saddle 20.

Mounted on the shaft 16 for slidable movement therealong is a weighted piston or plunger 23 biased into engagement with a cushioning disk 24 on the inner side of the front end wall 13 by a compression spring 25. The spring 25 is seated at one end on the wall 12 and at its opposite end on the piston or plunger 23. The plunger 23 is shown as having a rack 26 extending therealong and beyond the rear end thereof and secured thereto as by machine screws 27. The rack 26 is meshed with a pinion 29 on a shaft 30 and keyed or otherwise secured to said shaft. The shaft 30 is rotatably mounted on opposite parallel upstanding end portions 31 of a strap 33 extending about the casing 11 and welded or otherwise secured thereto, to form a rigid bearing support for the shaft 30 with the upstanding end portions 31 thereof extending upwardly along the outer longitudinal margin of a slot 35 in the casing 11 accommodating movement of the rack 26 along said casing.

The shaft 30 has a shouldered end portion 36 forming a mounting for a crank 37, secured to said shouldered end portion as by a nut 39 threaded on the shouldered end portion of said shaft. A hand grip 40 is rotatably mounted on the outer end portion of the crank 37 on a pin 41.

The pinion 29 as shown in FIGURE 2 has a gap 43 therein which may be formed by removing a selected number of teeth from said pinion to accommodate forward movement of the plunger 23 by the stored-up energy of the spring 25 as the pinion 29 is turned to bring the gap 43 into registry with the teeth of the rack 26. A handle 45 is provided on the rear end of the shaft 16 to enable the limb shaker to be held by the hand with the resilient face 21 of the saddle 20 in engagement with the limb of a tree to effect a shaking action of the limb.

In operation of the device, the resilient face 21 of the saddle 20 is brought into engagement with the limb of a tree and held in engagement with the limb by grasping of the handle 45 with the hand of the operator. The crank 40 is then turned in a clockwise direction to move the plunger 23 toward the end wall 12 and to compress the spring 25 and store-up energy therein. As the handle is turned into the position shown in FIGURE 2 where the cut away portion of the pinion 29 registers with the rack teeth 26, the spring 25 will be released and force the plunger 23 to move along the shaft 16 into engagement with the cushion 24 and transmit a shock to said shaft and the saddle connected thereto through the extension 19, to shake the limb and effect the dislodgment of ripened fruit or nuts from the limb of the tree.

It may be seen from the foregoing that a simplified form of limb shaker has been provided adapted for small orchards or groves where power shakers are not economically feasible and that the shaking action is attained by the stored-up energy in the spring 25 forcing the plunger 23 into engagement with a cushioned fixed abutment on the shaft 16 and thereby transmitting a shock to said shaft and the saddle on the end thereof to effect the shaking of the limb of a tree engaged by the cushioned end portion of said saddle.

While I have herein shown and described one form in which my invention may be embodied, it may readily be understood that various variations and modifications in the invention may be attained without departing from the spirit and scope of the novel concepts thereof as defined by the claim appended hereto.

I claim as my invention:

A shaker for shaking fruit and nuts from the limbs of trees comprising a casing having forward and rear end walls, a shaft secured to said forward end wall and projecting forwardly therefrom, a plunger within said casing mounted for movement therealong into engagement with said forward end wall, a spring interposed between said rear end wall and said plunger, means for moving said plunger against said spring and storing up energy therein and releasing said plunger to effect engagement of said plunger with said forward end wall with an impact action, comprising a rack on said plunger guided for movement along said casing and extending outwardly therefrom and retaining said plunger from turning movement with respect to said casing by guiding engagement of said casing, a pinion rotatably journalled on the outside of said casing and meshing with said rack, said pinion having a gap in the teeth thereof for releasing said rack to accommodate the stored-up energy of said spring to engage said plunger with said forward end wall with an impact action, and a saddle extending across the forward end of said shaft and fixed thereto and engageable with the limb of a tree to shake the limb by the impact force of engagement of said plunger with said forward end wall.

References Cited in the file of this patent

UNITED STATES PATENTS

| | | |
|---|---|---|
| 1,053,744 | Phillips | Feb. 18, 1913 |
| 1,306,584 | Droege et al. | June 10, 1919 |
| 1,484,845 | Phillips | Feb. 26, 1924 |
| 3,013,374 | Balsbaugh | Dec. 19, 1961 |